April 8, 1969   G. R. BOUWKAMP ET AL   3,437,082

FLOW METERING DEVICE

Filed June 23, 1967

United States Patent Office 3,437,082
Patented Apr. 8, 1969

3,437,082
FLOW METERING DEVICE
Gerald R. Bouwkamp, Villa Park, and Kenneth W. Lesher, Wheaton, Ill., assignors to Standard Screw Company, Bellwood, Ill., a corporation of New Jersey
Filed June 23, 1967, Ser. No. 648,408
Int. Cl. F02f *9/02;* F02m *25/06;* F16k *17/20*
U.S. Cl. 123—119                                                            7 Claims

ABSTRACT OF THE DISCLOSURE

A flow metering device for use in an automotive crankcase ventilation system comprising a valve housing having an inlet end, an outlet end, and a cavity formed therebetween, at least a portion of the cavity having a variable cross section to form a metering orifice. A spring is positioned within the cavity and has a plurality of coils, at least one of which is laterally offset relative to the others. The end offset coil engages a valve member so that the latter is capable of movement within the cavity into and away from the orifice in response to changes in pressure in the ventilation system.

BACKGROUND OF THE INVENTION

Field of the invention

This invention relates to air flow control or metering means and, more particularly, to metering valves adapted for use in various systems to materially reduce discharge into the atmosphere of blowby accumulating in the crankcase of an automotive engine, and thereby inducing smog.

Description of the prior art

It is generally known to reduce the discharge of blowby from the crankcase by utilizing a conduit communicating with the crankcase with the intake manifold of the engine so that the manifold vacuum will draw air and the blowby through the conduit and deliver the blowby laden current of air through to the cylinders. However, in such a system the performance of the engine will not be satisfactory unless there is a continuous flow of the air current.

Accordingly, it is necessary to provide some means to control or meter the flow. In U.S. Patent 3,263,699 it is proposed to utilize a metering valve disposed between the crankcase and the intake manifold which controls the flow of blowby therebetween. This particular type of valve disclosed has an elongated plunger designed to vary the size of a constant diameter orifice in response to changes in pressure differential. The plunger is positioned and supported by a compression spring, the end coil of which embraces the plunger at one end in a press fit. The coil is arranged to hold the plunger in such a position so that when it moves back and forth relative to the metering orifice in response to changes in the pressure differential, one side of the pin will ride against the adjacent wall portions of the orifice. This produces a dampening effect upon the oscillations or jiggling of the plunger within the valve orifice.

However, in this arrangement several problems developed. For example, the spring was found to oscillate thus creating problems; sludge and blowby residuals were found to build up on the plunger and/or spring reducing the flow through the valve; and close tolerances were required on both the plunger and the body diameters to meet specific flow tolerances.

SUMMARY OF THE INVENTION

It is therefore an object of the present invention to provide a flow metering device of the above general type which overcomes the problems connected with a varying diameter elongated plunger as set forth above.

Briefly summarized, the present invention relates to a flow metering device for use in an automatic crankcase ventilation system which features the use of a valve housing having an inlet end, an outlet end, and a cavity having a variable metering orifice extending therebetween, along with a spring-loaded ball valve adapted to move within said metering orifice in response to pressure differentials. The coils of the spring are so arranged that the ball valve is biased against adjacent wall portions of the cavity and the metering orifice in all operative positions of the ball valve, and the coils are of such a size that when the spring is compressed, they frictionally engage adjacent portions of the bore to dampen oscillations of the ball valve.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles and are not to be construed as restrictions or limitations on its scope. In the drawings.

DESCRIPTION OF THE PREFERRED EMBODIMENTS

Figure 1:
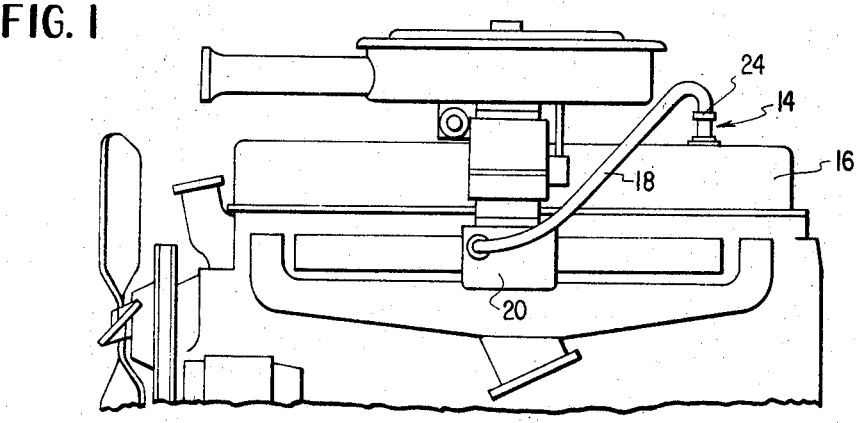
FIG. 1 is a skeleton elevation of a typical installation of a crankcase ventilation system.

Referring now to the details of the invention as shown in FIG. 1, the flow metering device 14 may be suitably attached to the rocker arm cover 16 of the engine with the outlet end up. A flexible tube or conduit 18 may be coupled at one end to the outlet end of the flow metering device and at the other end to the intake manifold 20. The means for interconnecting the parts of the ventilation system form no part of this invention inasmuch as these essentially plumbing details are well known to those skilled in the art.

Figure 2:
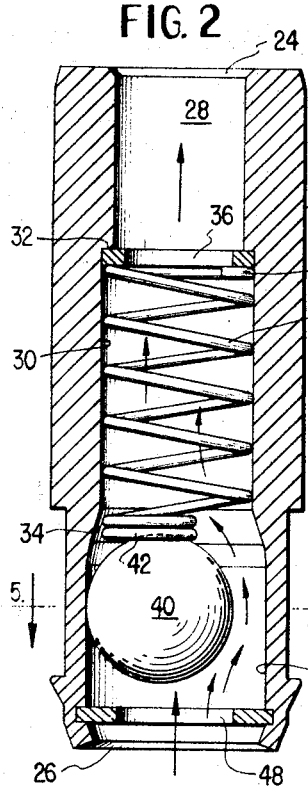
FIGS. 2, 3 and 4 are vertical sectional views of the flow metering device of the present invention showing the metering ball and spring assembly dispositions when the engine is at full acceleration, normal running, and idling operation, respectively.
Figure 3:
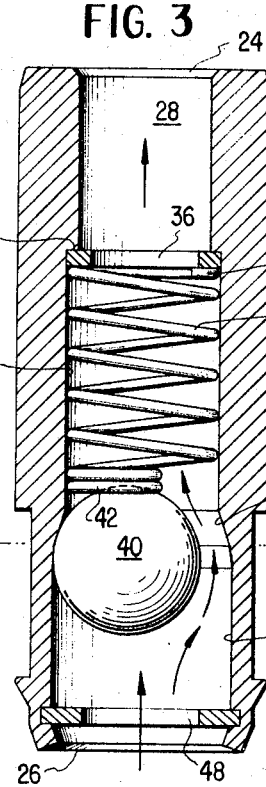
Figure 4:
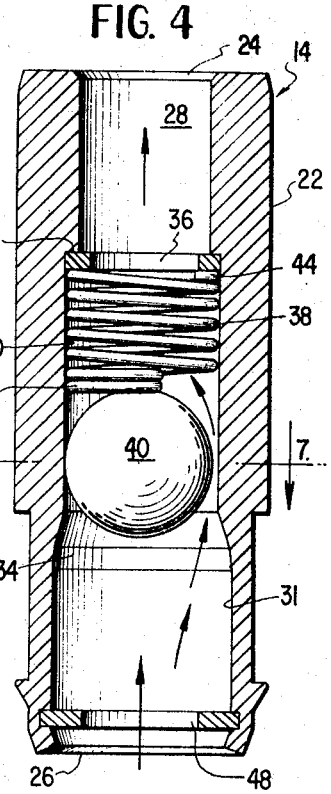

As seen from FIGS. 2–4, the flow metering device 14 has a hollow body member 22 having an outlet end 24 and inlet end 26. Two general cavities are formed in the hollow portion of body member 22, cavtiy 28 being formed adjacent outlet end 24, and cavity 30, adjacent inlet end 26. Cavity 28 is of a reduced cross section when compared to that of cavity 30, and acts as an air passage. A stop shoulder 32 is formed in the body member 22 and divides the latter into the two above-mentioned cavities.

Cavity 30 progressively increases in diameter from stop shoulder 32 in the direction towards the inlet end 26. The periphery of the progressively increasing portion of cavity 30 forms a variable metering orifice 34 which may be curved or which may consist of a combination of straight and curved sides. Towards the inlet end of cavity 30 the orifice 34 merges with an enlarged cylindrical portion 31 which extends to the inlet end 26.

A washer 36 may be provided which is seated against stop shoulder 32 and is frictionally held against displacement in cavity 30. Washer 48 is disposed at the inlet end 26 of cavity 31 and has a function which will be explained in detail later.

A compression spring 38 is provided in cavity 30 and is used to control movements of a ball valve 40 by normally urging it in a direction towards inlet end 26. The lowermost coil 42 at the inlet end of the spring 38 is arranged to embrace a portion of ball valve 40, and the upper coil 44 seats against the washer 36 in all of the engine load positions of the metering ball. The arrangement is such that in use, both the spring and the ball valve rotate with respect to the inner wall of body member 22 and with respect to each other.

Spring 38 has a generally straight outside diameter from its end down to a point on the ball valve seating end where 1½ to 2 coils, including coil 42, are reduced to approximately ½ of the coil size of the main body of the spring. The reduced size coils are offset towards one side of the central axis of body member 22 so that the outside diameter of the smaller coils is flush or tangent to the outside diameter of the large coils on one side.

Figure 5:
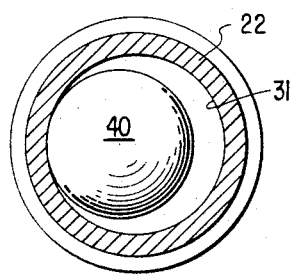
FIGS. 5, 6 and 7 are transverse cross sections taken along lines 5—5, 6—6 and 7—7 of FIGS. 2, 3 and 4, respectively.
Figure 6:
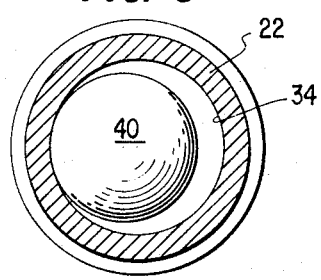
Figure 7:
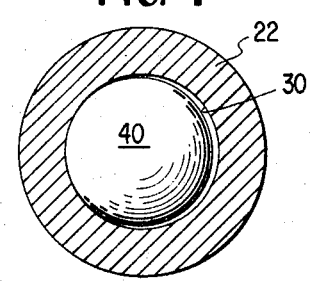

As a result of this construction and the engagement of offset coil 42 with the ball valve 40, the latter, under all load conditions, extends eccentrically in the cavity 30 causing portions of the metering ball to ride against adjacent wall portions of the cavity 30. Such a construction is clearly shown in FIGS. 5–7, and it produces a dampening effect which reduces the oscillations or jiggling which occur in a free floating pin or ball and causes an irregular or discontinuous metering of the flow through the ventilation system.

In operation the ball valve 40 is movable within cavity 30 in response to variations of the vacuum in the intake manifold. Specifically, during full acceleration of the engine, a relatively low vacuum occurs and the ball 40 assumes approximately the position shown in FIG. 2. Since the ball is restrained from entering orifice 34 by the action of spring 38, there is little restriction of flow of blowby laden air current through the body member 22, this flow being represented by the solid arrows in FIGS. 2–4. On the other hand, during engine idling the vacuum in the intake manifold is high and thus causes the ball to assume the position shown in FIG. 4, thus reducing the effective size of orifice 34, which in turn reduces the flow through the body member. FIG. 3 depicts a position of ball valve 40 which is intermediate the above two described positions, which may be termed a normal running position.

Of course, when the engine is not in use, the ball valve 40 assumes a position of rest on washer 48, it also being understood that this washer also serves as a limiter for movement of the ball valve during backfiring of the engine.

It will further be noted that coil 44 and the intermediate coils of spring 38 have an outer diameter slightly less than the cavity 30 so that, when the spring is compressed, these coils frictionally engage adjacent wall portions of the cavity 30. It has been found that this arrangement produces a self-cleaning action because the coils move towards and away from each other as the metering ball 40 moves back and forth.

It should be added that not only is it important that the orifice 34 be of a size to permit some flow during engine operation, but it should be of a size to permit a relief at the outlet side of the orifice when the ball valve 40 is in the engine idling position, as is best illustrated in FIG. 4.

The results of tests of such valves, in a remarkably high number of instances, produce a smooth flow curve well within the limits of the requirements of the manufacturer for each type of engine without the disadvantages usually present in the use of plunger type valves. For example, the valve was installed on an eight cylinder engine and, during an interval of 23,869 miles of driving, there was no apparent sludge build-up or flow deterioration.

This result is mainly due to the fact that the ball valve provides a free moving valve which tends to be more self-cleaning due to the fact that the ball valve is free to move or rotate with respect to the internal wall of the body member and with respect to the spring as it touches the body inside diameter contour during its inward and outward travel. Also, since ball bearings have an excellent surface finish and are controlled very precisely for size, sludge does not tend to adhere as readily, and additional manufacturing tolerances are permitted on a machined body inside diameter.

Although the ball-shaped valve member has been found to be highly satisfactory, it should be understood that other shaped valve members can be utilized as long as the above-mentioned conditions are maintained. For example, a cone-shaped valve member may be utilized which has a small stem end fitting into the reduced spring diameter. In this case the cone-shaped valve should have a relatively short length when compared to its diameter so it will maintain the functions of the ball-shaped valve noted above.

It also should be understood that the flow metering device of the present invention is not limited to use in an automotive crankcase ventilating system, but rather can be utilized in any environment requiring a variable fluid flow in response to pressure variations between two points.

We claim:

1. A flow metering device adapted for use in an automotive crankcase ventilation system comprising a valve housing having an inlet end, an outlet end, and a cavity disposed within its confines, at least a portion of said cavity being of a variable cross section to form a variable orifice; and a ball type valve member positioned within said cavity; spring means having a pluraltiy of coils, one of which engages said valve member, said valve member being capable of movement within said cavity into and out of said orifice towards and away from said outlet and in response to changes in pressure in said ventilation system, said spring means arranged so that portions of said valve member ride against adjacent wall portions of said cavity and said orifice in all operative positions of said valve member to dampen oscillations of the valve member, the side of said valve member opposite from the side riding against said wall portion being spaced from all wall portions of the cavity and orifice to permit fluid flow through said space.

2. The flow metering device as defined by claim 1, wherein said coils are of a size that when said spring is compressed, the coils frictionally engage adjacent portions of said cavity to thereby dampen oscillations of said valve member.

3. The flow metering device as defined by claim 1, wherein said ball valve is freely rotatable with respect to said spring and with respect to the wall portions of said cavity and said orifice.

4. The flow metering device of claim 1, wherein the ball valve and the spring are freely rotatable relative to the inner wall of said body member, and with respect to each other.

5. A flow metering device adapted for use in an automotive crankcase ventilation system comprising a valve housing having an inlet end, an outlet end, and a cavity disposed within its confines, at least a portion of said cavity being of a variable cross section to form a variable orifice; and a spring-loaded ball valve positioned within said cavity, said spring having a plurality of coils, at least one of which is laterally offset relative to the others, the end offset coil engaging said ball valve to urge said ball valve against adjacent wall portions of said cavity and said orifice to dampen oscillations of said ball valve during movement of same within said cavity and said orifice in response to changes in pressure in said ventilation system.

6. The flow metering device as defined by claim 5, wherein said ball valve is freely rotatable with respect to said spring and with respect to the inner wall of said body member.

7. The flow metering device as defined by claim 5, wherein the ball valve and the spring are freely rotatable relative to the inner wall of said body member and with respect to each other.

References Cited

UNITED STATES PATENTS

| | | | |
|---|---|---|---|
| 2,452,956 | 11/1948 | Robins | 251—278 X |
| 2,461,206 | 2/1949 | Fouse et al. | |
| 2,986,132 | 5/1961 | Matz. | |
| 3,165,097 | 1/1965 | Lowther. | |
| 3,181,833 | 5/1965 | Adams et al. | |
| 3,225,752 | 12/1965 | Robinson. | |
| 3,263,699 | 8/1966 | Givler et al. | |
| 3,354,898 | 11/1967 | Barnes | 137—480 X |

FOREIGN PATENTS 668,844   7/1929   France.

AL LAWRENCE SMITH, *Primary Examiner.*

U.S. Cl. X.R.

137—330, 480, 539